United States Patent [19]
Groenendaal et al.
[11] 3,829,783
[45] Aug. 13, 1974

[54] GENERATOR FOR GENERATING A NUMBER OF SELECTED FREQUENCIES

[76] Inventors: Gradus Cornelis Groenendaal, Emmasingel, Eindhoven; Hans Cool; Jacob De Vos, both of Jan ver der Heydenstraat 41, Hilversum; Eduard Willem Van Zuuren, Emmasingel, Eindhoven, all of Netherlands

[22] Filed: Feb. 26, 1973

[21] Appl. No.: 335,673

[30] Foreign Application Priority Data
Mar. 4, 1972 Netherlands........................7202908

[52] U.S. Cl......................... 328/14, 328/39, 328/48, 179/90 K
[51] Int. Cl............................................ H03b 19/00
[58] Field of Search................................ 328/14–39, 328/48; 84/103; 179/90 K

[56] References Cited

UNITED STATES PATENTS

| | | | |
|---|---|---|---|
| 3,500,213 | 3/1970 | Ameau | 328/14 |
| 3,538,256 | 11/1970 | Lucas | 179/90 K |
| 3,590,131 | 6/1971 | Reyers | 84/1.03 |
| 3,610,801 | 10/1971 | Fredkin et al. | 84/1.03 |
| 3,657,657 | 4/1972 | Jefferson | 328/14 |
| 3,671,871 | 6/1972 | Malm | 328/14 |

*Primary Examiner*—Charles D. Miller
*Attorney, Agent, or Firm*—Frank R. Trifari

[57] ABSTRACT

A generator for generating a number of selected frequencies, comprising a pulse oscillator and a number of dividers which are connected thereto, a second number of dividers which also coupled to the former dividers via a switching network in order to adjust, under the control of the switching network, dividends which produce desired combinations of frequencies derived from the oscillator frequencies, in particular tone frequencies for tone pushbutton selection signalling, the dividers of the second group also being binary-to-digital signal converters to which first-order RC-networks are connected in order to suppress higher harmonics.

8 Claims, 3 Drawing Figures

GENERATOR FOR GENERATING A NUMBER OF SELECTED FREQUENCIES

The invention relates to a generator for generating a number of selected frequencies, comprising a pulses oscillator and a number of dividers.

A generator of this kind, used as a tone generator for an electronic musical instrument, is known from Netherlands Patent Application 6,802,134. The dividers described therein are dividers by two which are connected to the pulse oscillator in cascade. The pulse sequences supplied by the dividers by two are used to form, by means of gate circuits, pulse sequences whose number of pulses per second corresponds to the selected frequencies.

The magazine "Revue de Physique Appliquée", September 1967, pages 175 to 183, describes a generator which also comprises a cascade of dividers by two which are connected to a pulse oscillator. The outputs of the dividers by two are applied to one output terminal via gate circuits which are provided with control inputs. By means of the control voltages applied to the control inputs, the combination of the pulse series supplied by the dividers by two from which the pulse sequence to be generated is built up, can be adjusted and hence the number of pulses per second of this sequence.

However, the pulse sequences obtained in the described manner have irregular pulse distributions. This means that the selected frequencies exhibit substantial jitter. It is known that irregularities of the distributions of the pulses can be reduced by applying the pulse sequences to individual identical dividers and by choosing the pulse repetition frequency of the pulse sequence supplied by the pulse oscillator to be higher by a factor which is equal to the dividend of these dividers.

The said generators have the drawback that either the selected frequencies exhibit substantial jitter, or that the total number of dividing stages required is large which, moreover, necessitates an oscillator having a very high oscillation frequency.

Another drawback is that, in order to derive the selected frequencies with a low higher-harmonic level from the pulse repetition frequencies of the generated pulse sequences, complex additional filters are required.

The invention has for its object to render the type of generator of the kind set forth suitable for realizing the successsive selection of combinations of selected frequencies with a minimum number of dividing stages without jitter occurring, the suppression of higher harmonics of the selected frequencies being achieved by means of very few additional means.

The device according to the invention is characterized in that a switching network is provided, the dividers being divided into two groups, each divider of the first group being connected to the pulse oscillator, the dividers of the second group being coupled, via the switching network, to the dividers of the first group in order to apply frequency combinations of the selected frequencies to outputs of the dividers of the second group by means of the switching network.

According to another characteristic, the dividers of the second group are also binary-to-digital converters for deriving digital signals from pulse sequences supplied by the dividers of the first group, the fundamental frequencies of the said digital signals constituting the selected frequencies, the signal levels of the higher harmonics thereof being low with respect to the signal levels of the fundamental frequencies.

The invention and its advantages will be described in detail hereinafter with reference to the embodiments shown in the figures.

Figure 1:
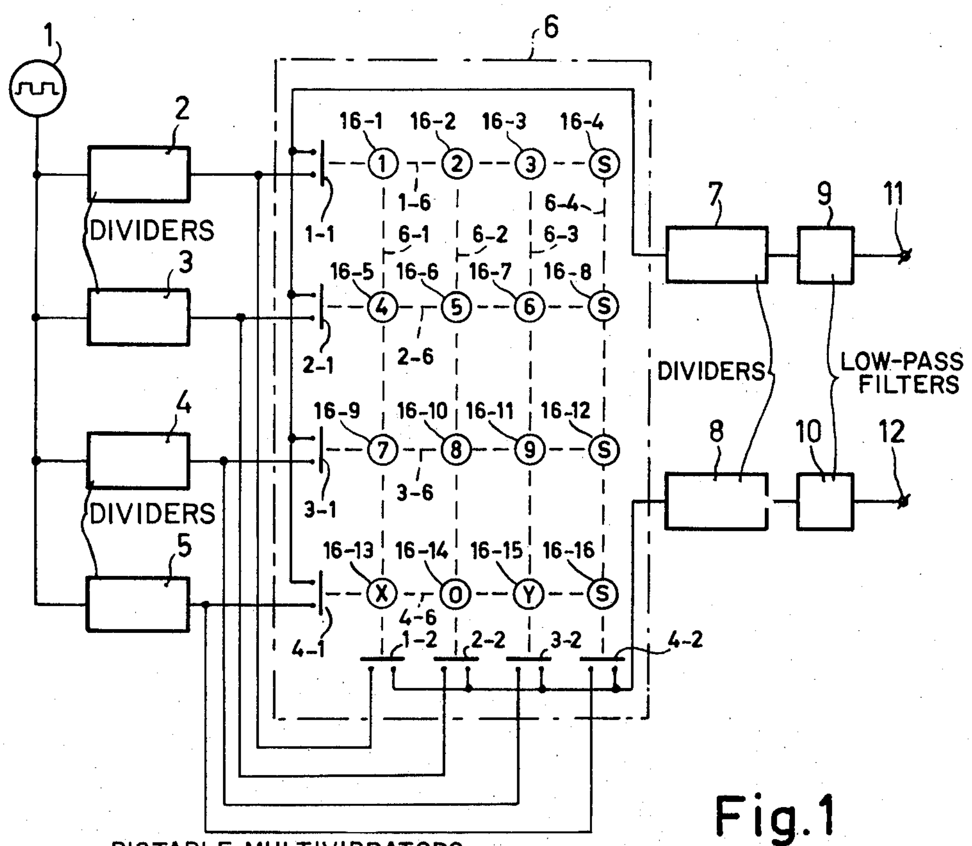
FIG. 1 shows an embodiment of a generator according to the invention.

The generator which is shown in the embodiment of FIG. 1 is intended for use as a tone generator in a pushbutton telephone set which is designed for use in a special tone frequency signalling system. In this signalling system use is made of two different frequency bands which are situated within the frequency band of a speech channel, each frequency band comprising four signalling frequencies. For the transmission of an information signal one signalling frequency of the one frequency band is combined with one signalling frequency of the other frequency band. The signalling frequencies recommended by C.C.I.T.T. Com.XI in document No. 101 are 697, 770, 852, and 941 Hz successively for the lowest of the two frequency bands, and 1,209, 1,336, 1,477 and 1,633 Hz successively for the highest frequency band, a maximum frequency deviation of ± 1.5% being permitted, the level of the higher harmonics and of any intermodulation distortion signals being at least 20 dB lower than the level of the generated fundamental frequencies.

In order to remain within the required frequency tolerance of ± 1.5%, while taking into account the effects of relative himidity, voltage fluctuations, temperature fluctuations, and ageing phenomena, the signalling frequencies are preferably derived from crystal-stabilized oscillators. It is advantageous to use one crystal-stabilized oscillator and to derive all signalling frequencies from the signal frequency supplied by this oscillator. At the same time it is then achieved that the signalling frequencies cannot shift with respect to each other. Use is made of digital techniques in order to derive the signalling frequencies with high accuracy from the signal frequency supplied by the oscillator. Moreover, the generator can then be realized in integrated form for the better part.

Use is made of a crystal-stabilized pulse oscillator 1 which is known per se, and the signalling frequencies are derived from the signal frequency of the oscillator by means of dividers. The use of an individual divider for each signal frequency to be generated would imply eight dividers. In order to obtain a generator which comprises less dividers and in which each divider is less complex without the generated frequencies having substantial jitter, and which is designed for the successive selection of selected frequency combinations, the generator according to the invention is provided with a switching network 6 and the dividers 2, 3, 4, 5, 7 and 8 are divided into two groups, 2 to 5 and 7 and 8, each divider 2 to 5 being connected to the pulse oscillator 1, the dividers 7 and 8 being coupled, via the switching network 6, to the dividers 2 to 5 in order to supply two of the selected eight frequencies to the outputs of the divider 7 and 8 by means of the switching network 6.

To this end, the switching network 6 is constructed as a pushbutton selector switch provided with pushbuttons 16–1 to 16—16 which are arranged in four rows and four columns. Each pushbutton 16 is coupled, via a rod 1–6 to 4–6 which is provided per row, to a switching contact 1–1 to 4–1 which is provided per row and, via a rod 6–1 to 6–4 which is provided per column, to a switching contact 1–2 to 4–2 which is provided per column. By means of the switching contacts 1–1 to 4–1, the dividers 7 can be connected to each of the dividers 2 to 5, and by means of the switching contacts 1–2 to 4–2 the divider 8 can also be connected to each of the dividers 2 to 5. For example, when pushbutton 16–9 is depressed, switching contact 3–1 is closed via rod 3–6, and switching contact 1–2 is closed via rod 6–1. Divider 7 is then connected to the output of divider 4 via the closed switching contact 3–1, and divider 8 is connected to the output of divider 2 via switching contact 1–2. As is shown in the Figure, the frequencies 1,209, 1,336, 1,477 and 1,633 Hz which are recommended for the high frequency band as well as the frequencies 697, 720, 852 and 941 Hz which are recommended for the low frequency band are derived, by means of the dividers 7 and 8, from the frequencies supplied by the dividers 2 to 5 which are connected to the pulse oscillator 1. Use is made of the fact that the frequencies of the low band and the high band which are recommended by C.C.I.T.T. relate as 0.5765 ± 0.0003 : 1.

The dividends of the dividers 7 and 8 must approximate this relationship as closely as possible. For integer dividends up to fourty of the dividers 7 and 8, the relationship of which deviates less than ± 1.5% from the relationship of the frequencies of the low and the high frequency band, the dividends stated in the first and the second column of the table are feasible.

TABLE

| Dividends of the dividers 7 | 8 | 2 | 3 | 4 | 5 | Frequency pulses oscillator in Hz |
|---|---|---|---|---|---|---|
| 4 | 7 | 17 | 19 | 21 | 23 | 112.170 |
| 7 | 12 | 17 | 19 | 21 | 23 | 194.180 |
| 11 | 19 | 26 | 29 | 32 | 35 | 468.000 |
| 15 | 26 | 77 | 85 | 94 | 104 | 1.884.000 |
| 19 | 33 | 78 | 86 | 95 | 105 | 2.416.000 |
| 21 | 37 | — | — | — | — | — |

On the basis of the dividends of the dividers 7 and 8 stated in the first and the second column, the recommended frequencies and a maximum frequency tolerance of ± 1.5%, the smallest integer dividends of the dividers 2 to 5 and the associated oscillator frequencies can be calculated. These dividends and the oscillator frequencies are given for some special cases in the columns three to seven of the table.

If the requirement that the oscillator frequency must be as low as possible is used as a basis, which is identical to the requirement that dividers having as small as possible dividends must be used, the dividends and the oscillator frequency are as shown in the first row of the table. The relative frequency deviation amounts to ± 1.014% for these dividends. The oscillator frequency can then deviate ± 0.486 % before a relative frequency deviation of ± 1.5% is reached.

If an as small as possible frequency deviation of the generated frequency with respect to the recommended frequencies at an oscillator frequency below 2 MHz is used as a basis, the dividends and the oscillator frequency are as stated in the fourth row of the table. The frequency deviation is then less than ± 1.2 ‰. The oscillator frequency can then vary ± 1.38% before inadmissible frequency deviations from the recommended frequencies occur.

If use is made of an existing, commercially available oscillator which is utilized in radio receivers and whose oscillator frequency amounts to 468,000 Hz, the dividends are as shown in the third row of the table. The maximum relative frequency deviation is then ± 0.97%, so that the oscillator frequency may vary ± 0.43%. This generator offers the advantage that a commercially available oscillator can be used in which the dividends of the dividers are not excessively large.

As appears from the foregoing description, only six dividers are required for realizing the generator, and as a result of the series connection of the dividers 7 and 8 to the dividers 2 to 5 it is achieved that dividends of the dividers are comparatively small. Moreover, the dividers 7 and 8 supply regular pulse sequences of their output terminals so that the generated frequencies are free from jitter. From the pulse repetition frequencies of the pulse sequences supplied by the dividers 7 and 8, the recommended tone frequencies can be obtained by means of low-pass filters 9 and 10 which are connected to these dividers and which suppress the higher harmonics to a level of at least –20 dB. These tone frequencies are available on the output terminals 11 and 12. These output terminals each time supply two out of eight tone frequency signals under the control of the tone push-button selector switch, as is required for the described special tone frequency signalling system.

The frequency of the third harmonic of the lowest tone frequency signal of the special tone frequency signalling system amounts to 2,091 Hz, and the frequency of the highest tone frequency signal amounts to 1,633 Hz. This small difference between the frequencies of an harmonic and one of the tone signals, and also the requirement imposed by C.C.I.T.T. that the sum of the levels of all higher harmonics must be at least 20 dB lower with respect to those of the generated tone signals, implies that severe requirements must be imposed as regards the filtering properties of the low-pass filters 9 and 10. If these filters are realized by analog techniques, higher-order networks are required which contain many components on the one hand, and which are difficult to integrate on the other hand. The latter objection can be eliminated by using, digital techniques as much as possible instead of analog techniques for realizing the filters 9 and 10. Such digital filters are known, inter alia from Netherlands Patent Application 7,013,780. The use of the filter described therein has the drawback that an oscillator having, for example, an oscillator frequency which is eight times higher must be used in order to compensate for a side-effect of the filter, implying an additional division by eight of the oscillator frequency, whilst the filter must be realized by means of additional components.

Figure 2:
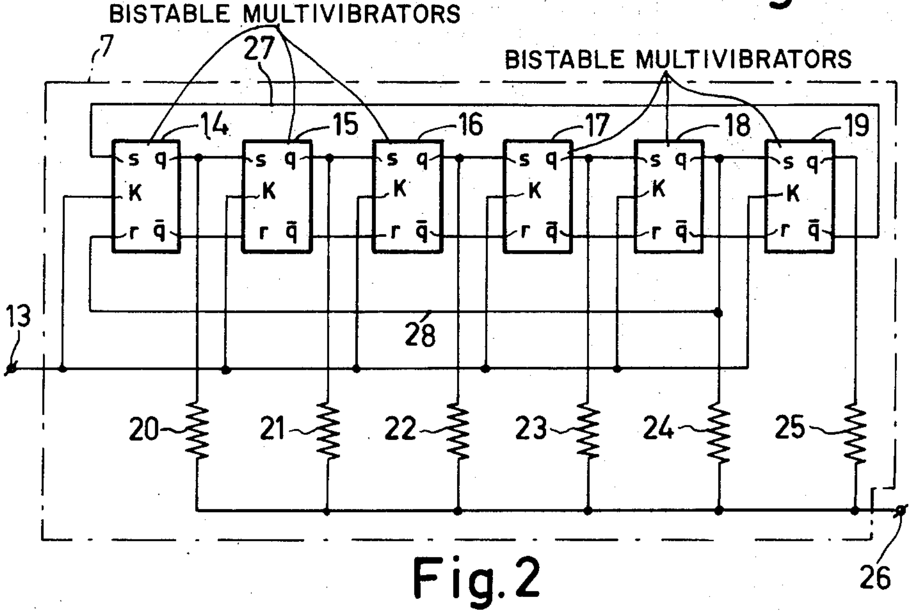
FIG. 2 shows an embodiment of the divider 7 of the embodiment of a generator shown in FIG. 1.

In order to achieve a suppression of the higher harmonics which satisfies the requirements imposed by C.C.I.T.T., incorporating very few additional components and offering an oscillator frequency which is determined only by the dividends of the dividers of the first and the second group and by the selected tone signals, the dividers of the second group are constructed according to the invention as binary-to-digital converters as is shown in FIG. 2 for the divider 7 a modified switch ring counter, (see pages 191–192 of "Electronic Digital Techniques" by P. M. Kinter copyright 1968) of FIG. 1.

This divider 7 comprises, by way of example, six bistable elements 14 to 19, each of which is provided with a set input $s$, a reset input $r$, a signal output $q$, an inverted signal output $\overline{q}$, and a shift pulse input K. Each bistable element is constructed such that at the instants at which a voltage which is applied to the shift pulse input changes from a high value to a low value, a high voltage which is present on the set input $s$ or the reset input $r$ sets or resets, respectively, this element; this is characterized by a a high voltage on the signal output $q$ or on the inverted signal output $\overline{q}$, respectively.

Because the signal output $q$ and the inverted signal output $\overline{q}$ of the bistable elements 14 to 18 are connected to the set input $s$ and the reset input $r$, respectively, of the bistable elements 15 to 19, the bistable elements 14 to 19 are connected in cascade.

Information stored in the bistable element 19 is applied from the inverted signal output $\overline{q}$, via a first feedback conductor 27, to the set input $s$ of the bistable element 14, and information stored in the bistable element 18 is applied from the signal output $q$, via a second feedback conductor 28, to the reset input of the bistable element 14. Furthermore, the shift pulse inputs K of the bistable elements 14 to 19 are connected to an input terminal 13.

Figure 3:
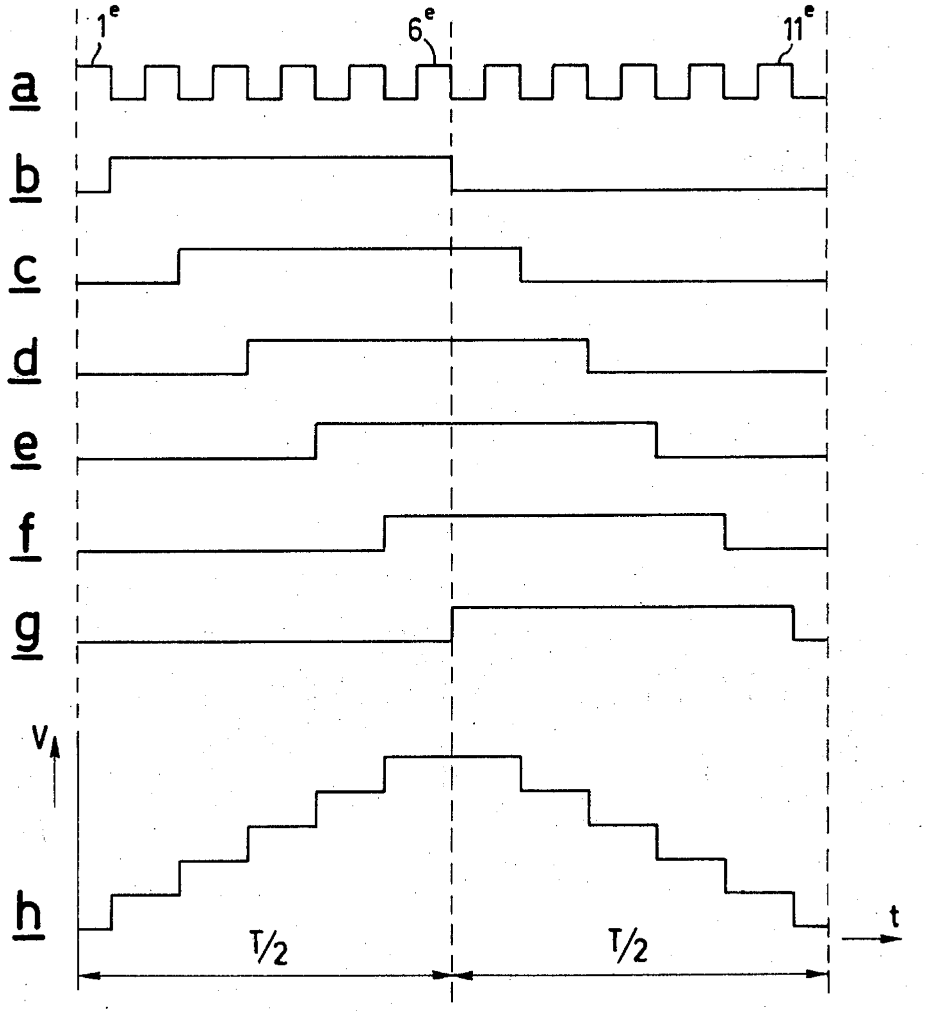
FIG. 3 shows some signals which can occur in the divider shown in FIG. 2.

Assuming that all bistable elements are in the reset state, the operation is as follows. Via the switching network 6, one of the pulse sequence supplied by the dividers 2 to 5 is applied to the input terminal 13. This pulse sequence is shown in FIG. 3*a*. FIGS. 3*b* to 3*g* show the voltages appearing on the signal outputs $q$ of the elements. As appears from these figures, the bistable element 14 is set on the trailing edge of the first pulse applied to the terminal 13 as a result of the high state of the voltage on the inverted signal output $\overline{q}$. On the trailing edge of the second pulse, the element 15 is set etc. The trailing edge of the sixth pulse sets element 19 and resets element 14 as a result of the fact that the signal output of element 18 has a high voltage. The trailing edge of the next pulse resets element 15 etc., until upon the trailing edge of the eleventh pulse all elements have been reset and the circuit has returned to its initial position. One cycle is thus completed every eleven pulses. Each of the signal outputs $q$ of the elements 14 to 19 is connected, via a separate, in this embodiment an identical weighting resistor 20 to 25, to an output terminal 26, with the result that the linear sum of all output voltages of the bistable elements is present on this terminal. This sum voltage, shown in FIG. 3*h*, represents a digital signal which is an approximation of a sinusoidal signal and which is repeated once for every eleven pulses applied to the input terminal 13. The fundamental frequency of this digital signal is thus eleven times lower than that of the signal applied to the input terminal 13. The higher harmonics of this sum signal have a level much lower than that of a squarewave pulse with 50% pulse duration modulation. By constructing the filter 9 as a first-order RC-filter, the level of the higher harmonics will be in total at least 20 dB lower with respect to the level of the fundamental frequencies. In accordance with the third row of the table, the dividend eleven of the divider 7 implies that the dividend of divider 8 must be 19. By constructing this divider in the same manner as that shown in FIG. 2, with the exception of the number of bistable elements which must amount to ten in this case, a digital signal is obtained which approximates a sinusoidal signal, the level of the harmonics being even lower than that appearing when use is made of six bistable elements. The filter 10 can then again be a first-order RC-network. A further simplification can be obtained by interconnecting the outputs of the filters 7 and 8, and by omitting one of the filters 9 or 10.

It appears from the foregoing that by a small modification of the dividers 7 and 8, requiring a number of resistors which is equal to the number of bistable elements of these dividers and also requiring bistable elements which are provided with a shift pulse input K, the filters 9 and 10 can be very readily realized and the requirements imposed by C.C.I.T.T. are satisfied, while the oscillator frequency need not be increased.

It is to be noted that if one of the dividers 8 or 9 has an even dividend, as stated in the second and the fourth row of the Table, the feedback conductor 28 must not be connected to the signal output $q$ of the last bistable element but one (18), but to the signal output $q$ of the last bistable element (19).

What is claimed is:

1. A generator for simultaneously generating two frequencies, comprising a fixed frequency oscillator, a plurality of first dividers connected in parallel each having an input connected to said oscillator, two second dividers each composed of a modified switch ring counter and a digital to analog converter one of said second dividers having a division ratio equal to 0.5765 times the other of the second dividers, and switching means for selectively connecting one of the second dividers to one of the first dividers and for selectively connecting the other of the second dividers to one of the first dividers.

2. A generator as claimed in claim 1, wherein each divider of the second group comprises an input terminal, an output terminal and a number of cascade connected bistable elements, each of said bistable elements being provided with a set input, a signal input, a reset input, an inverted signal output, and a shift pulse input, the set input and the reset input of the second through the last bistable element inclusive of the cascade connection being connected to the signal output and the inverted signal output of the first through the last bistable element being connected to the signal input of the first bistable element, the signal output of the next to last bistable element being connected to the reset input of the first bistable element for a divider having a dividend 2N-1 (N =1, 2 . . . ), the shift pulse inputs of all bistable elements of a divider being connected to the input terminal thereof, and a separate weighting resistor connecting each of the signal outputs of the bistable elements of the divider to the output terminals of the divider.

3. A generator as claimed in claim 1, wherein each divider of the second group comprises an input terminal, an output terminal and a number of cascade-connected bistable elements, each of said bistable elements being provided with a set input, a signal output, a reset input, an inverted signal output, and a shift pulse input, the set input and the reset input of the second through the last bistable element inclusive of the cascade connection being connected to the signal output and the inverted signal output of the first through the last bistable element but one, the inverter signal output of the last bistableelement being connected to the signal input of the first bistable element, the signal output of the last bistable element being connected to the reset input of the first bistable element for a divider having the dividend 2N (N= 1, 2, . . . ), the shift pulse inputs of all bistable elements of a divider being connected to the input terminal thereof, and a separate weighting resistor connecting each of the signal outputs of the bistable elements of the divider to the output terminal of the divider.

4. A generator as claimed in claim 3, wherein the outputs of the dividers of the second group are interconnected, one first-order RC-network being connected thereto.

5. A generator for generating the frequencies recommended by C.C.I.T.T. Com XI in Document No. 101 for tone push-button selection signalling as claimed in claim 1, wherein the first group of dividers is formed by four dividers.

6. A generator as claimed in claim 1, wherein the dividends of the first group of dividers are 101, 94, 85 and 77, the dividends of the second group being 26 and 11.

7. A generator as claimed in claim 1, wherein the dividends of the first group of dividers are 23, 21, 19 and 17, the dividends of the second group being 7 and 4.

8. A generator as claimed in claim 1, wherein the dividends of the first group of dividers are 35, 32, 29 and 26, the dividends of the second group of dividers being 19 and 11.

* * * * *

PO-1050
(5/69)

UNITED STATES PATENT OFFICE
CERTIFICATE OF CORRECTION

Patent No. 3,829,783 Dated August 13, 1974

Inventor(s) GRADUS C. GROENENDAAL ET AL

It is certified that error appears in the above-identified patent and that said Letters Patent are hereby corrected as shown below:

On the title page, insert

--[73] Assignee: U. S. Philips Corporation--.

Claim 2, line 46, after "the" (second instance) insert

--next to last bistable element, the inverted signal output of the--.

Signed and sealed this 29th day of October 1974.

(SEAL)
Attest:

McCOY M. GIBSON JR.
Attesting Officer

C. MARSHALL DANN
Commissioner of Patents